(No Model.)

H. A. W. SMITH.
PLOW.

No. 525,867. Patented Sept. 11, 1894.

Witnesses
J. M. Fowler Jr.
Thomas Durant

Inventor
Henry A. W. Smith,
By Church & Church
his Attorneys.

UNITED STATES PATENT OFFICE.

HENRY A. W. SMITH, OF MINNEOLA, VIRGINIA.

PLOW.

SPECIFICATION forming part of Letters Patent No. 525,867, dated September 11, 1894.

Application filed December 20, 1893. Serial No. 494,197. (No model.)

*To all whom it may concern:*

Be it known that I, HENRY A. W. SMITH, of Minneola, in the county of Pittsylvania and State of Virginia, have invented certain new and useful Improvements in Plows; and I do hereby declare the following to be a full, clear, and exact description of the same, reference being had to the accompanying drawings, forming a part of this specification, and to the letters of reference marked thereon.

This invention relates to improvements in plows, more particularly iron shovel plows, and has for its object to obviate the necessity of resetting the point of the beam upon which the shovel or share is mounted.

The invention consists in certain novel details of construction which will be now described and pointed out in the appended claim.

Figure 1:
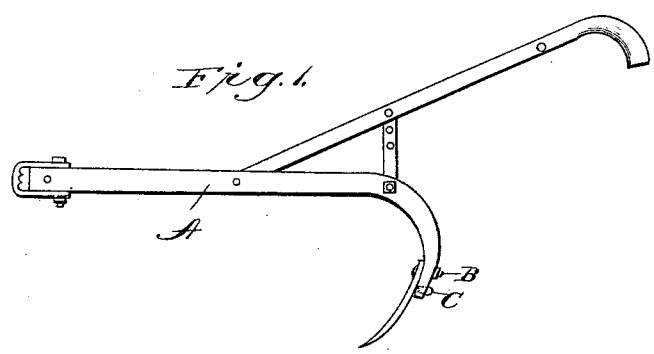
Figure 2:
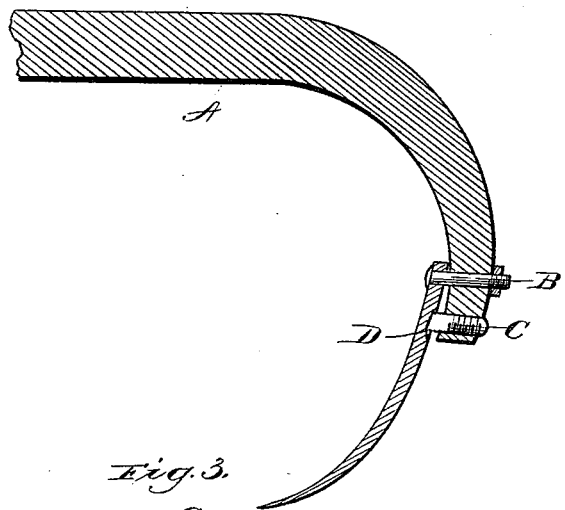
Figure 3:
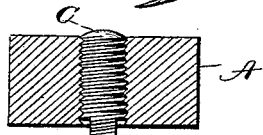

In the accompanying drawings: Figure 1 is a side elevation illustrating the application of my invention. Fig. 2 is a vertical section, and Fig. 3, a horizontal section through the end of the beam and shovel shank.

Like letters of reference in the several figures indicate the same parts.

The letter A indicates an iron beam of ordinary construction, and which preferably constitutes the main portion or frame of the plow. The handles, &c., being attached in the ordinary well known manner, constitute no part of my present invention and need not be further described. In this form of plow, the rear end of the beam is usually curved down and forward slightly for the attachment of the shovel or share, if it be a single share plow and bifurcated and extended down in the same manner for the attachment of the shovels or shares, if it be a double shovel plow, and it is found in practical use, that when the shovels or shares have become worn or broken, and it is desired to renew them, or the plow has been subjected to hard usage, it becomes necessary to have the beam taken to the shop and reset by being heated and bent forward in order to give the shovel the proper set so as to enter the ground at the proper angle, and to a sufficient depth, without burrowing. Even with the shovels set properly, when it is desired to vary the depth at which the shovels shall run, it can only be done by changing the harness on the horse, thereby raising or lowering the front end of the beam and consequently changing the angle at which the shovel stands.

My invention has for its object to overcome these difficulties, and to provide a device which is simple, strong and not liable to become damaged or get out of order by constant or hard use, and in carrying it into practice, I provide the beam some distance above its point, with an opening for the reception of a bolt B, by means of which the upper end of the shovel or upper end of the shovel shank is secured to the beam in the ordinary manner, and at the lower end of the beam I form a threaded aperture for the reception of a set screw C, the point of which projects on the forward side of the beam and forms a rest or stop against which the shovel comes to rest.

In the preferred construction, the rear face of the shovel or its shank is provided with a groove or recess D into which the end of the set screw is adapted to fit, thus not only preventing any lateral movement of the shovel itself, but also locking the set screw against accidental movement. The set screw, it will also be observed is flattened or cut away so as to present flat faces for the application of a wrench by means of which the screw may be adjusted. This enables me to dispense with a head or other protection on the rear side of the beam and hence there is little or no danger of the same being knocked off or broken in rough usage.

Should the beam become set or it become desirable for any purpose to change the angle of inclination of the shovel, it can be readily accomplished by first loosening the bolt B and turning the set screw to the desired point of adjustment, then placing the shovel in position and tightening the bolt B. This adjustment is easily and quickly made. Hence the farmer may change the angle of the shovel while in the field, should it become necessary to vary the depth at which the shovel travels.

Having thus described my invention, what I claim as new is—

In a plow, such as described, the combination with the beam having the downwardly and forwardly extending rear end and the shovel or share having the recess in its rear side, of the bolt connecting the top of the shovel and beam and the set screw having flat faces passing through the beam in proximity to the connecting bolt and co-operating with the recess on the rear side of the shovel, whereby the inclination of the shovel may be varied and the set screw is prevented from turning; substantially as described.

H. A. W. SMITH.

Witnesses:
 DRYDEN WRIGHT,
 O. C. WRIGHT.